United States Patent [19]

Roither

[11] Patent Number: 5,175,507
[45] Date of Patent: Dec. 29, 1992

[54] METHOD OF AND DEVICE FOR DEMODULATING BIPHASE MODULATED SIGNAL

[75] Inventor: Gerhard Roither, Munich, Fed. Rep. of Germany

[73] Assignee: SGS-Thomson Microelectronics, GmbH, Fed. Rep. of Germany

[21] Appl. No.: 738,780

[22] Filed: Aug. 1, 1991

[30] Foreign Application Priority Data

Aug. 2, 1990 [DE] Fed. Rep. of Germany ....... 4024593

[51] Int. Cl.⁵ .......................................... H04L 27/20
[52] U.S. Cl. ..................................... 329/304; 375/80; 375/87
[58] Field of Search ............... 329/304, 305, 306, 307, 329/308, 309, 310; 375/80, 83, 87; 341/70, 71

[56] References Cited

U.S. PATENT DOCUMENTS 3,514,706 5/1970 Dupraz et al. .................... 375/87 X
4,763,338 8/1988 Barndt, Sr. ............................ 375/82
5,001,728 3/1991 Füldner ............................ 329/310 X

FOREIGN PATENT DOCUMENTS

2040108B2 4/1977 Fed. Rep. of Germany .
3510562C2 12/1988 Fed. Rep. of Germany .

OTHER PUBLICATIONS

European Broadcasting Union, "Specifications of the Radio Data System RDS for VHF/FM Sound Broadcasting", Mar. 1984, pp. 5–10, 58.

Primary Examiner—Siegfried H. Grimm
Attorney, Agent, or Firm—Pennie & Edmonds

[57] ABSTRACT

A method of demodulating a biphase modulated signal is implemented by first establishing a reference phase angle level. The biphase modulated signal contains a series of bits, each bit having first and second half-bits. The half-bits are represented by opposite phase angle levels. First and second phase angle levels correspond to the first and second half-bits respectively. After the levels associated with first and second half-bits are measured, the two levels are compared. A binary value is assigned to each pair of first and second half-bits based on the relationship of their respective levels. For example, a high phase angle level followed by a low level, can represent the binary value "1", and vice versa.

12 Claims, 3 Drawing Sheets

METHOD OF AND DEVICE FOR DEMODULATING BIPHASE MODULATED SIGNAL

SUMMARY OF THE INVENTION

The invention relates to a method of demodulating a signal that is biphase modulated with a binary bit sequence, in which a change in bit value is represented by a phase shift of the carrier wave, as well as to a device for performing such demodulation.

When a signal is biphase modulated with a binary bit sequence, there is one phase reversal taking place between each half-bit. In the case of a change of the binary valence of the bit sequence modulated upon said signal, a phase shift of 180° occurs in the carrier wave instead of the bit change.

A signal that is biphase modulated with a binary bit sequence is used for instance in the so-called RDS system (Radio Data System). In RDS, broadcasting stations sending RDS information transmit the station identification, alternative frequencies of the station, program type, etc. RDS is compatible with the ARI (Autofahrer-Rundfunk-Information or broadcast information for motorists) system, which renders possible identification of FM stations broadcasting traffic information. More details are described in the publication "Specifications of the Radio Data System (RDS) for VHF/FM Sound Broadcasting", Tech. 3244-E, Technical Center of the European Broadcasting Union, Bruxelles, March 1984.

In RDS, an 1187.5 Hz square wave is phase modulated on the transmitting side with a bit sequence containing the RDS information. Upon change of the binary valence, the square wave displays a phase shift of 180°. The phase-modulated square wave is subject to low-pass filtering and is then modulated upon a carrier wave. In conformity with the ARI system the carrier frequency is 57 kHz. However, the RDS signal is phase-shifted by 90° with respect to the ARI signal. The phase modulation depth of the RDS signal is therefore influenced by the ARI signal. When no ARI signal is present, the RDS signal with respect to the carrier phase has a phase shift of +90° and −90° in alternating manner. When there is an ARI signal, the RDS signal with respect to the carrier wave has a phase shift of $\pm 8.9° < \phi < \pm 32°$.

After RDS modulation, the 57 kHz carrier is suppressed. The resulting signal is added to a stereo signal with a stereo pilot carrier of 19 kHz. The signal resulting then, the so-called MUX signal, which constitutes a combined stereo and RDS information signal, is then converted to a frequency modulated transmitting signal having the carrier frequency of the particular broadcasting station.

On the receiving side, for instance in a car radio, the 57 kHz carrier will be recovered with the aid of a quartz oscillator and a digital "Costas loop". Recovery of the RDS information usually is effected by a comparison of the phase of the received RDS signal with the phase of the 57 kHz carrier wave regenerated on the receiving side.

In the regeneration of the 57 kHz carrier on the receiving side, the carrier wave produced on the receiving side is synchronized with the received RDS signal. Due to disturbances in the transmission path between transmitter and receiver, for instance by reflections on buildings, the received RDS signal may include a phase error. Due to the fact that the received RDS signal is used for regenerating the 57 kHz carrier on the receiving side, such phase errors created in the transmission path appear in the regenerated carrier wave. When the RDS signal has only a relatively small phase deviation due to the simultaneous transmission of an ARI signal, the phase error in the regenerated carrier wave, which is caused by transmission errors, may be greater than the phase deviation of the received RDS signal containing the RDS information. Because of the phase errors in the regenerated carrier wave, the comparison of the phase of the received RDS signal with the phase of the regenerated carrier wave will then lead to errors in recovering the RDS bit sequence containing the RDS information. Therefore, the phase shifts in the received RDS signal will not be fully recognizable.

RDS information is transmitted in information packages or groups of 104 bits each, which are composed of four blocks of 26 bits each. Each block is composed of an information word with 16 bits and a checkword with 10 bits. Even when just one bit of an information package is recovered erroneously, all the information of the information package may be wrong and thus becomes useless. It is thus extremely important that each bit of the RDS signal is recovered correctly on the receiving side.

It is an object of the present invention to make available a method of and a device for demodulating a signal that is biphase modulated with a binary bit sequence, which provides accurate recovery of the bit sequence modulated upon said signal.

In the method according to the invention, the fact that the modulated biphase signal has between the half-bits of each modulation bit a phase shift in the form of a phase reflection or mirror image with respect to the phase angle 0°, is taken advantage of to the extent that for each bit the relative relationship between the phase occurring in the first half-bit and the phase occurring in the second half-bit is formed on the receiving side. The phase relationship thus gained allows a definite determination as to the binary value of the respective bit for whose half-bits the phase relationship has been formed. Depending on whether this relationship or ratio formation yields a higher phase value in the first or in the second bit half, the binary value "1" or the binary value "0" is associated with the corresponding bit.

According to the invention, the binary value recovery is dependent only on the relative phase relationship between first and second half-bit of each bit, and is no longer dependent on a comparison of the respective phase with an absolute phase value that may be afflicted with errors. The method according to the invention leads to accurate recovery of the bit sequence modulated upon the signal on the receiving side even in the case of significant phase errors that may arise during transmission between transmitter and receiver.

For establishing the relationship of the phases occurring in both half-bits, it is possible to make use of a reference phase angle with a level selected such that it is greater that the maximum phase angle deviation of the biphase modulated signal. For doing so, the distance of the phase angle of the received signal to the reference phase angle is determined in each half-bit of the respective bit to be demodulated. The ratio of the phase angle distances thus gained then contains the information corresponding to the binary value of the associated bit.

The phase of the regenerated carrier wave can be used for generating the reference phase angle. To this end the regenerated carrier wave is phase-shifted by a shift angle which is at least as large as the sum of the maximum phase deviation of the biphase modulated signal and the maximum occurring phase error of the received signal. The phase relationship between the first and second half-bits in this case results in absolutely positive recovery of the bit sequence even when there are phase errors present in the transmitted signal. Preferably a shift angle of 180° is employed.

When low-pass filtering takes place, as it is done in RDS on the transmitting side before the phase modulated square wave is modulated upon the carrier wave, the modulation signal on the receiving side does not have a square, but rather an approximately sinusoidal phase pattern. In this case the relationship between the phase angle patterns in the first and second half-bits, respectively, is preferably formed with the aid of an integration method. For doing so, a reference phase angle is preferably employed in the manner elucidated hereinbefore and the area between the phase pattern of the received signal and the pattern of the reference phase angle is formed separately in both half-bits each. The areas obtained in each of the two half-bits by integration are then correlated with each other and the resulting relationship determines the binary value of the associated bit.

It is particularly advantageous to utilize therefor an integration means integrating up during the one half-bit and down during the other half-bit. Depending on whether the integration value obtained at the bit end is positive or negative, the binary value "0" or the binary value "1" will be associated with the bit concerned.

When an analog system is involved, the integration can be performed by using a capacitor that is charged positively during the one half-bit and negatively during the other half-bit. The sign of the capacitor charge at the moment of the bit end then determines the binary value of the associated bit.

In the case of a digital system, the invention uses in a particularly preferred embodiment an up/down counter as an integrating device. Clock pulses of sufficiently high frequency are counted up during one half-bit and down during the other half-bit. Depending on whether the counting value at the bit end is positive or negative, the one or the other binary value will be associated with the bit concerned.

When, as in the case of RDS, the carrier frequency is an integer multiple of the bit frequency, a multiple of the carrier frequency is selected as the counting clock frequency. A particularly preferred embodiment of the invention provides during each carrier wave period, a time window of predetermined duration and predetermined phase position with respect to the recovered carrier wave. Counting clocks are counted in each time window during that period of time during which the received biphase modulated signal has a predetermined binary value. In doing so, all counting clocks counted during the one half-bit are counted up in accumulating manner and all counting clocks counted during the other half-bit are counted down in accumulating manner. The sign of the counting value present at the bit end then again determines the binary value of the recovered bit.

In the time range of the bit changes and half-bit changes which are to coincide with zero-axis crossings of the phase pattern of the biphase modulated signal, uncertainties may arise due to disturbances. In a particularly preferred embodiment of the invention, blocking windows of predetermined duration are therefore formed in the time range of the bit changes and half-bit changes, with these blocking windows being exempted from the formation of the relationship of the phase pattern between the two half-bits. In digital systems in which the formation of said relationship is performed by counting, preferably up/down counting, the counting operation is suspended for the duration of the blocking windows.

For performing the demodulation method according to the invention, preferably an up/down counter is used in the case of a digital system, with said counter being periodically switched between up and down counting with the aid of a clock corresponding to the bit frequency and indicating the half-bit changes. Furthermore, the counter is reset with every bit change. The counting clock input of the counter has an AND circuit connected upstream thereof which has an input for counting pulses, an input for the biphase modulated signal, an input for the time window signal and possibly an input for the blocking window signals. The counter output has an assessment circuit connected downstream thereof which evaluates the count of the counter present at the bit end and determines the binary value of the demodulated bit depending on the sign of this count.

BRIEF DESCRIPTION OF THE DRAWINGS

These and other objects, features and advantages of the invention will become more readily apparent from the following detailed description of a preferred embodiment of the invention in which:

FIG. 4 shows a device according to the invention for performing the demodulation method.

DETAILED DESCRIPTION OF THE PREFERRED EMBODIMENT

Figure 1:
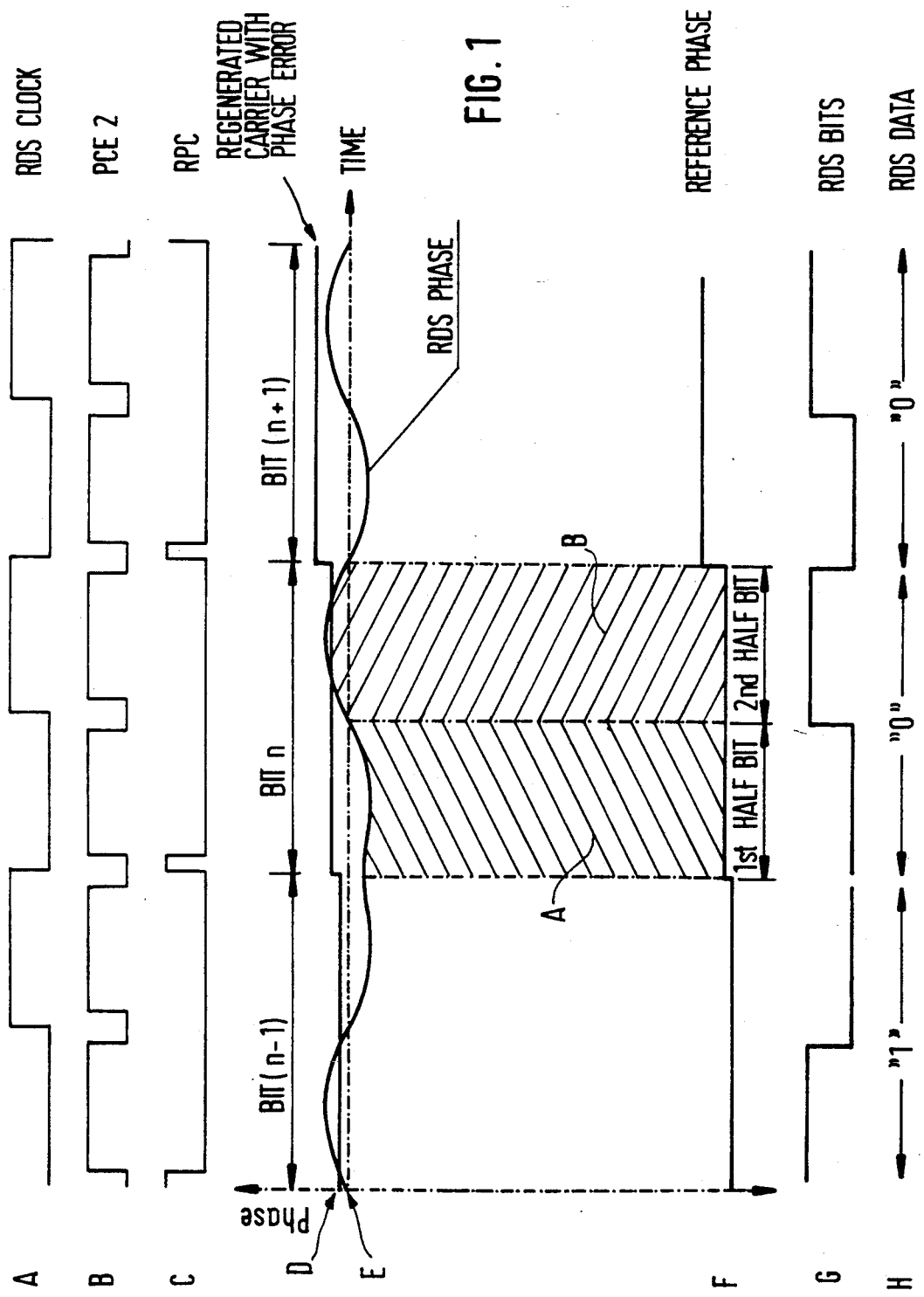
FIG. 1 shows an example of the phase pattern of an RDS signal on the receiving side and of some digital signal patterns on the receiving side.

FIG. 1 illustrates signal patterns A to G and a binary value sequence H for an exemplary section of an RDS signal on the receiving side of an RDS system consisting of a transmitter and receivers.

The phase pattern E of the RDS signal is substantially sinusoidal due to low-pass filtering. The drawing shows three bits, (n−1), n and (n+1). The time axis shown in a dot-dash line constitutes simultaneously the line of the phase angle 0. Each bit can be subdivided into two half-bits, with the phase angle of the RDS signal being positive during one half-bit and negative during the other half-bit. In bit (n−1), the phase pattern is positive in the first half-bit and negative in the second half-bit. In bits n and (n+1) it is vice versa. This means that a phase shift occurs between the bits (n-1) and n, which signals a transition from the one binary value to the other binary value.

On the basis of the presentation according to H in FIG. 1 it shall be assumed by way of example that the binary value "1" is associated with a bit having a positive phase pattern during the first half-bit and a negative phase pattern during the second half-bit, whereas the binary value "0" is associated with bits of opposite phase pattern. On the basis of this assumption, the section of the RDS signal shown in FIG. 1 represents the bit sequence 1 0 0.

The sinusoidal pattern of the RDS signal E was created by low-pass filtering of a digital signal as shown as signal pattern G in FIG. 1. Between each half-bit of every single RDS bit (i.e., at the center of the bit), signal G changes phase. In case of a bit sequence of identical binary values, no phase shift occurs between the bits. Where two successive bits have different binary values, a phase shift occurs between the bits. For example, in signal pattern G, the first half-bit of bit n has the same phase value as the second half-bit of bit (n−1).

Pattern D in FIG. 1 shows an exemplary phase error pattern of the 57 kHz carrier regenerated on the receiving side. If the conventional method were employed for recovering the binary values of the RDS bit sequence, in which the RDS phase pattern is compared in each half-bit of every bit with the erroneous phase position of the regenerated carrier wave, correct results would be obtained for bits (n−1) and n, but not for bit (n+1). For, in case of the latter bit, because of phase errors, the RDS phase pattern during both half-bits is below the phase angle of the regenerated carrier. The phase reversal of the RDS phase pattern between the first and second half-bits is thus not recognized and as a consequence thereof the demodulation of the RDS bit sequence becomes erroneous.

In contrast thereto, the demodulation method according to the present invention employs the formation and assessment of the relationship between the RDS phase pattern during the first half-bit and the RDS phase pattern during the second half-bit. To this end a reference phase pattern F is utilized, which is created by shifting the regenerated carrier by a predetermined shift phase angle of preferably 180°. Since the RDS phase pattern is approximately sinusoidal due to said low-pass filtering operation, an integration method is used for ascertaining this relative relationship. In particular, the areas present during the two half-bits between the reference phase pattern F and the RDS phase pattern E are ascertained by integration in separate manners for the first half-bit and the second half-bit each, and are compared with each other at the end of the associated bit. This is shown in FIG. 1 for bit n. By such integration, the two areas A and B (shown in a hatched manner) are ascertained and compared with each other at the end of bit n. When area A is smaller than area B, the binary value "0" is presumed for bit n, as in the case of the binary value association assumed in FIG. 1. When, however, area A is greater than area B, binary value "1" is associated, which would be the case for the bit (n−1).

As long as the phase distance between the zero phase of the RDS signal E and the reference phase pattern F is selected to be sufficiently large in consideration of the maximum phase deviation of the RDS signal and the maximum occurring errors, this method will always result in the recovery of the correct binary value, completely independent of the instantaneous phase error.

FIG. 1 illustrates furthermore signals A to C generated on the receiving side and all formed by division from an oscillator frequency of 8.664 MHz generated on the receiving side. Signal A depicts an RDS clock having a frequency of 1187.5 Hz which corresponds to the bit repetition rate of the RDS bit sequence. Signal A also serves as an up/down switching signal for a counter 25 (FIG. 4). Signal B depicts a blocking window signal PCE2. Signal C depicts a reset signal RPC for counter 25. The function of these signals will be elucidated further hereinafter.

Figure 2:
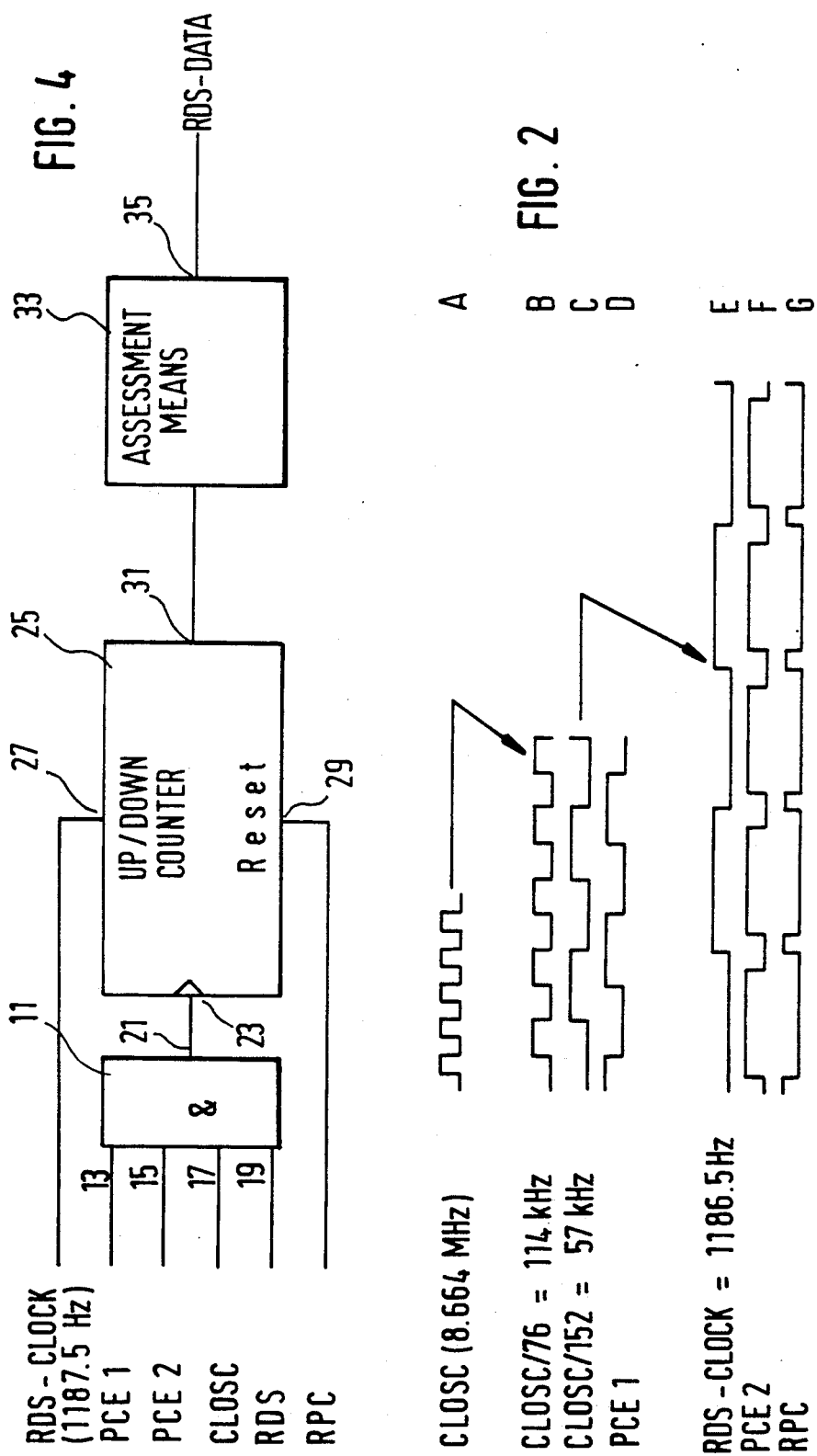
FIG. 2 shows further digital signal patterns on the receiving side.

FIG. 2 shows signal patterns A to G. Signal A illustrates the aforementioned oscillator signal having a frequency of 8.664 MHz. By dividing the oscillator signal A down, square-wave signals according to patterns B and C with a frequency of 114 kHz and 57 kHz, respectively, are formed. Signal C with the frequency 57 kHz constitutes the carrier that is regenerated on the receiving side. Signal pattern D shows a time window signal PCE1 having the carrier frequency of 57 kHz, but being phase-shifted by 90° with respect to said regenerated carrier C. Finally, FIG. 2 shows signal patterns E to G which correspond to signal patterns A to C in FIG. 1.

Figure 3:
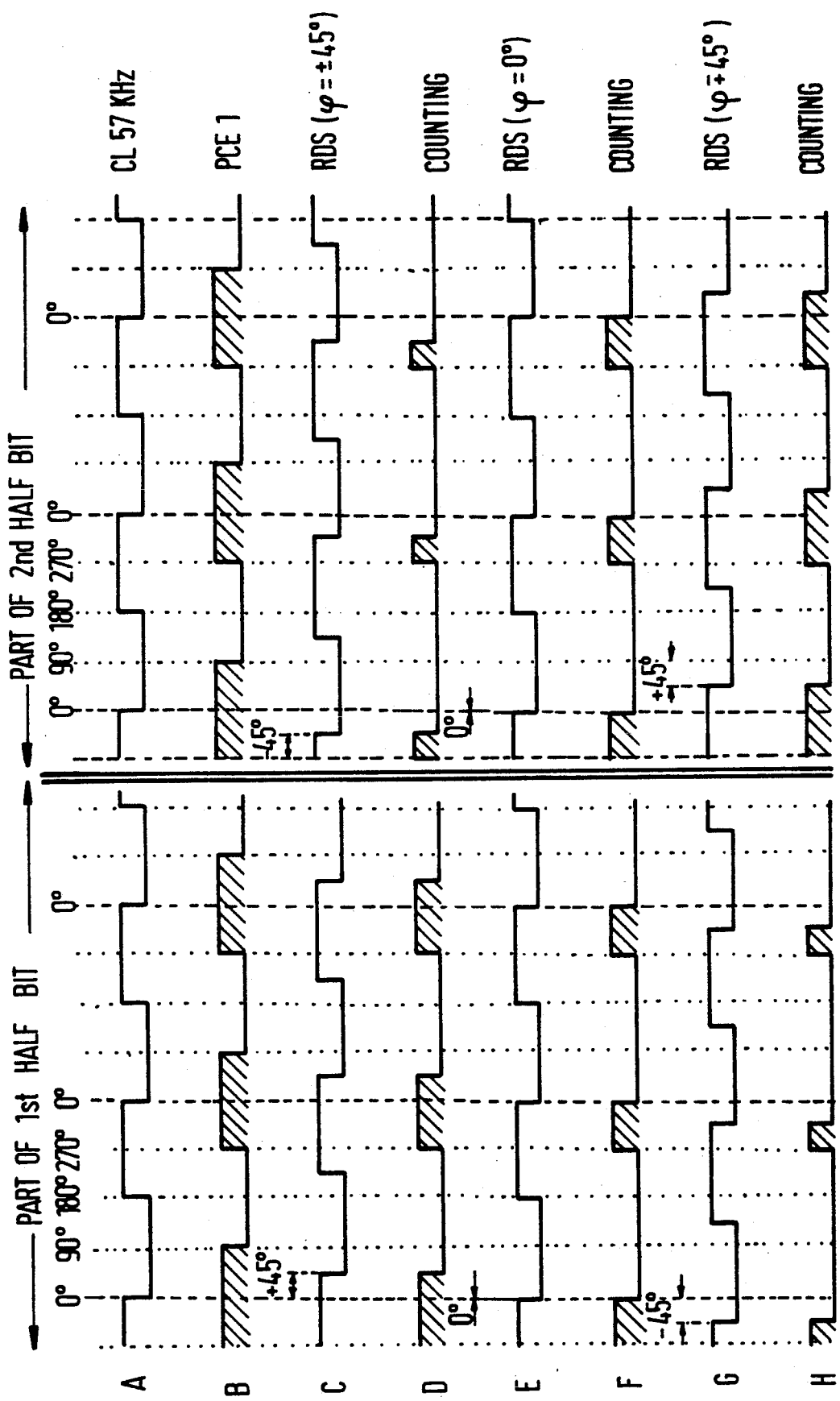
FIG. 3 shows signal patterns including three examples of RDS signals with different phase positions, during part of a first half-bit and part of a second half-bit of an RDS bit.

FIG. 3 shows sections of the two half-bits of one single RDS bit for various phase positions of the received RDS signal in comparison with the 57 kHz RDS carrier.

Signal pattern A shows the RDS carrier. Due to the fact that the 57 kHz of the RDS carrier are 48 times the 1187.5 Hz of the RDS bit repetition rate, there are for each half-bit 24 periods of the RDS carrier. FIG. 3 shows little less than three periods in each half-bit.

Signal pattern B in FIG. 3 illustrates the time window signal PCEI which has the same frequency as the RDS carrier but is phase-shifted therefrom by 90°. Signal patterns C, E and G of FIG. 3 show three examples of RDS signals having, in comparison with the RDS carrier, a phase difference of +45°, 0° and −45°, respectively, in the first half-bit and a phase shift of −45°, 0° and +45°, respectively, in the second half-bit. The phase shifts of +45° and −45° in FIG. 3 were chosen for the sole reason that these phase angles are easy to draw. As was already mentioned, phase shifts of at the most +32° and −32°, respectively, occur when ARI modulation is present in addition to RDS modulation.

FIG. 4 shows a preferred embodiment of an RDS demodulator operating in accordance with the principles of this invention. An AND circuit 11 comprises four inputs 13, 15, 17, and 19. An output 21 of the AND circuit 11 is connected to a counting clock input 23 of an up and down counter 25. Counter 25 additionally comprises a switching control input 27 (to select between up and down) and a resetting input 29. An output 31 of the counter 25 has an assessment means 33 connected thereto, with the demodulated RDS bit sequence being available at the output 35 of said assessment means.

Inputs 13, 15, 17, and 19 of AND circuit 11 are fed with the time window signal PCEI, the blocking window signal PCE2, the oscillator signal CLosc, and with the received RDS signal, respectively. The blocking window signal PCE2, in accordance with signal pattern B in FIG. 1, temporarily assumes a low signal value during the bit changes and half-bit changes, so that the AND circuit 11 is blocked during these times and so that no counting clock signals can reach the counter 25. Outside of the blocking window times, PCE2 has a high signal value, so that the AND circuit is released during these times.

As can be seen from the signal pattern B in FIG. 3, the time window signal PCE1 opens the AND circuit 11 each time 90° before until 90° after the beginning of a new period of the RDS carrier. The time window signal PCE1 releases the AND circuit 11 during these time intervals. The clock pulses Closc of the oscillator on the receiving side, which are not shown in FIG. 3, thus pass the AND circuit outside of the blocking window times and then reach counting input 23 of counter 25 when both the time window signal PCE1 and the RDS signal have a high potential value. The time ranges during which the time window signal PCE1 permits counting are indicated in FIG. 3 in hatched manner. FIG. 3 shows furthermore in representations D, F and H hatched portions which indicate at what time the counter 25 receives, in the three examples C, E and G for the RDS signal, clock pulses Closc as pulses to be counted. As can be seen in FIG. 3, the counting times in both half-bits are alike only in the event that the RDS signal does not have a phase difference with respect to the regenerated RDS carrier. In other cases, however, the counting times in both half-bits are different. When the phase shift of the RDS signal with respect to the RDS carrier is +45° in the first half-bit and, thus, −45° in the second half-bit, a counting duration results according to representation D during each bit period in the first half-bit, which is three times as large as the counting duration during a bit period of the second half-bit. Thus, per RDS period the counter 25 counts in the first half-bit three times as many counting pulses as in the second half-bit. Representation H in FIG. 3 leads to the opposite result, since it is part of an example of an RDS signal in which a phase shift of −45° with respect to the recovered RDS carrier is present in the first half-bit and a phase shift of +45° with respect to the recovered RDS carrier is present in the second half-bit.

The counting pulses reaching the counter 25 during the individual RDS periods are counted for each half-bit in accumulating manner, with up counting being carried out in accumulating manner for the first half-bit and down counting being carried out in accumulating manner for the second half-bit. The ratio of up counted to down counted pulses is of course the same as if counting had been carried out in each half-bit during one single RDS period only.

At the moment of change from the first half-bit to the second half-bit, the counter 25 is switched from up counting to down counting, with the aid of the RDS clock supplied to its switching control input 27. At the end of the second half-bit and thus at the end of the associated bit, the counter 25 is reset with the aid of the reset signal RPC supplied to its resetting input 29. Before the counter 25 is reset, the count thereof reached at the bit end is delivered via its output 31 to the assessment means 33. It is merely necessary there to ascertain whether the final counting value is positive or negative. When the final counting value is positive, this is an indication of the fact that area A in FIG. 1 was greater than area B, which in the example assumed in FIG. 1 would mean that the associated RDS bit has the binary value "1". When, however, the final counting value of the counter 25 is negative, this means that area B was greater than area A, so that binary value "0" is to be assigned. The RDS bit sequence modulated upon the signal on the transmitting side is thus available at the output of the assessment means 33.

I claim:

1. A method of demodulating a biphase modulated signal comprising:
    measuring a first phase angle variation of said biphase modulated signal corresponding to a first half-bit of said biphase modulated signal,
    measuring a second phase angle variation of said biphase modulated signal corresponding to a second half-bit of said biphase modulated signal,
    comparing said first and second phase angle variations of said biphase modulated signal, and
    assigning a binary value to each pair of said first and second half-bits based on a relationship between said first and second phase angle variations.

2. A method according to claim 1, wherein the relationship between said first phase angle variation and said second phase angle variation is determined by comparing each of said first and second phase angle variations of said biphase modulated signal with a reference phase angle, said reference phase angle being greater in amount than a maximum phase angle deviation of said biphase modulated signal.

3. A method according to claim 2, wherein the angular difference between said reference phase angle and said first and second phase angle variations of the biphase modulated signal is integrated for the formation of two integrals, each of said integrals formed during said respective first and second half-bit transmissions, and wherein said relationship between said first and second phase angle variations is determined by comparing said two integrals.

4. A method according to claim 3 for demodulation in a digital system, wherein:
    said biphase modulated signal is formed by phase modulating a carrier wave with a sequence of binary bits, the carrier wave having a carrier frequency and a carrier wave period, the sequence of binary bits having a bit frequency, and counting clocks having a counting clock frequency, comprising suppressing said carrier wave at a transmission side and regenerating said carrier wave at a receiving side, and wherein
    said carrier frequency is an integer multiple of said bit frequency and said counting clock frequency is a multiple of said carrier frequency,
    during each carrier wave period of time window of predetermined duration and predetermined phase position with respect to said regenerated carrier wave is formed, comprising:
    using a counter for integration, the counter being connected for counting counting clocks,
    setting said counter to count up during transmissions of one of said first or second half-bits
    setting said counter to count down during transmissions of the other one of said first or second half-bits, and
    determining said binary value of the associated bit at the end of the bit transmission based on the net count developed by said counter,
    said counting clocks being counted during that part of said time window duration during which said received biphase modulated signal has a predetermined signal value.

5. A method according to claim 4 further comprising:
    forming blocking windows of predetermined duration during the bit changes and half-bit changes; and
    preventing the counting of said counter during the blocking windows.

6. A method according to claim 2, wherein said biphase modulated signal is formed by phase modulating a carrier wave comprising:
    suppressing said carrier wave at a transmitting side,
    regenerating said carrier wave at a receiving side, and determining a reference phase angle by shifting the phase angle of said regenerated carrier wave by an amount at least as large as the sum of said maximum phase angle deviation of said biphase modulated signal and a maximum phase angle error of said regenerated carrier wave.

7. A method according to claim 6, wherein said phase angle of said regenerated carrier wave is shifted by an angle of 180°.

8. A method according to claim 1 further comprising: forming blocking windows of predetermined duration whose time intervals are exempted from the formation of said phase angle relationship during the times of the bit and half-bit transitions.

9. A method according to claim 1, wherein said biphase modulated signal is an RDS signal.

10. A device for demodulating a signal that is biphase modulated with a binary bit sequence, in which each binary bit comprises a first half-bit and a second half-bit and a change in binary value is represented by a phase shift of a carrier wave, as a part of a digital system, comprising:
- an up/down counter which has a counting pulse input, an up/down switching control input, a resetting input and a counter output,
- an AND circuit having an output coupled to said counting pulse input and including a counting clock input, a signal input and a time window input,
- an assessment means coupled to the counter output for evaluating the count of the counter present at the bit end and, depending on the sign of this count, outputting the binary value "1" or the binary value "0", with these binary values determining the demodulated bit sequence,
- the up/down switching control input being fed with a signal corresponding to the bit sequence in frequency position and phase position, such that up counting is controlled during the one half-bit and down counting is controlled during the other half-bit,
- a resetting signal being supplied to the resetting input at every bit change,
- the counting clock input being fed with a counting clock whose frequency is a multiple of a carrier frequency of the carrier wave,
- the signal input being fed with the biphase modulated signal, and
- the time window input being fed with a time window signal which releases the AND circuit for a predetermined time portion of each carrier wave period in a predetermined phase interval with respect to the carrier wave.

11. A device according to claim 10, wherein the AND circuit additionally comprises a blocking control input fed in the time range of the bit changes and half-bit changes with a blocking window signal which blocks the AND circuit for the duration of each blocking window signal.

12. A device according to claim 10, wherein the biphase modulated signal is an RDS signal.

* * * * *